United States Patent [19]

Cully et al.

[11] 4,201,808
[45] May 6, 1980

[54] RADIATION CURABLE SILICONE RELEASE COMPOSITIONS

[75] Inventors: Maryann Cully, Croton-on-Hudson; Arthur N. Pines, Katonah; Richard B. Metzler, Ossining; Gunther W. Babian, Peekskill, all of N.Y.

[73] Assignee: Union Carbide Corporation, New York, N.Y.

[21] Appl. No.: 914,889

[22] Filed: Jun. 12, 1978

[51] Int. Cl.² .................... A61F 13/02; C08F 30/08
[52] U.S. Cl. .................... 428/40; 204/159.13; 427/387; 427/54.1; 428/41; 428/42; 428/352; 428/447; 428/452; 525/479
[58] Field of Search ............ 204/159.13; 428/452, 428/447, 352, 40, 41, 42; 427/54, 387; 260/827

[56] References Cited

U.S. PATENT DOCUMENTS

| 3,575,788 | 4/1971 | Funk | 428/452 |
| 3,575,910 | 4/1971 | Thomas | 428/447 |
| 3,726,710 | 4/1973 | Berger | 204/159.13 |
| 3,749,593 | 7/1973 | Keiser | 428/452 |
| 3,759,807 | 9/1973 | Osborn | 204/159.13 |
| 3,878,263 | 4/1975 | Martin | 260/825 |
| 4,026,826 | 5/1977 | Yoshida | 204/159.13 |
| 4,064,286 | 12/1977 | Hahn | 204/159.13 |

FOREIGN PATENT DOCUMENTS 1433461  4/1976  United Kingdom.

Primary Examiner—Ellis P. Robinson
Attorney, Agent, or Firm—Stanley Ktorides

[57] ABSTRACT

Release-coated material is produced by applying to a substrate, e.g. paper, a coating of a radiation curable composition comprising (a) an organopolysiloxane containing an average of at least one acryloxy and/or methacryloxy group per molecule, (b) a low molecular weight polyacrylyl crosslinking agent and, optionally, (c) a photosensitizer; and curing the composition on the substrate by exposing it to ionizing radiation or actinic non-ionizing radiation.

31 Claims, 1 Drawing Figure

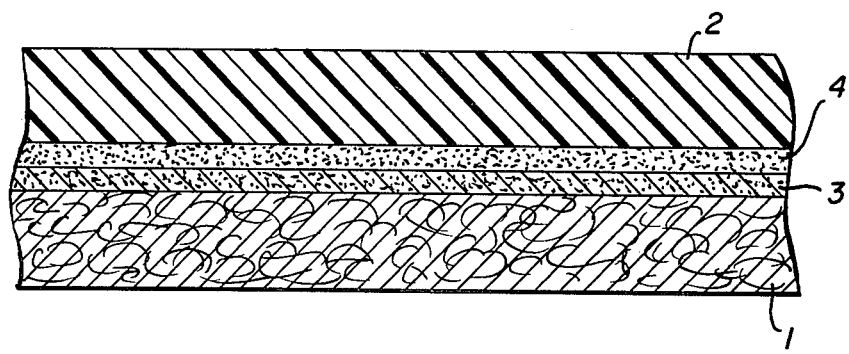

RADIATION CURABLE SILICONE RELEASE COMPOSITIONS

This invention relates to silicone release coatings; to compositions and methods useful in the preparation of silicone release coatings; and to substrates having silicone release coatings thereon, particularly paper substrates having such coatings thereon.

Silicon release coatings have been employed in a variety of uses for many years. Typically, paper substrates having silicone release coatings on their surfaces have been employed as protective coverings for pressure sensitive adhesives. It is customary in the pressure sensitive adhesive tape industry to apply a pressure sensitive adhesive composition to one or both sides of a polymeric tape backing, e.g. cellophane or polyethylene terephthalate, and then to wind the adhesive-coated tape about a cylindrical core or mandrel to form a roll. Of course, this results in the adhesive composition being simultaneously in contact with two overlying layers of the rolled tape. This may result in the bonding of the rolled layers to each other, making it difficult for the user to draw the tape off the roll, or it may result in "adhesive transfer". "Adhesive transfer" refers to the transfer of part or all of the adhesive composition from the tape surface on which it was originally applied to the surface with which it is in contact on the roll.

In order to circumvent the aforementioned problems, a paper substrate having a silicone release coating on one or both of its surfaces is interposed between the layers of adhesive-coated tape. This facilitates unwinding of the tape by the user, who then removes the release-coated paper from the unwound adhesive tape and discards it.

It is desirable that a silicone-coated release paper used in the manner described above have a low release force and not adversely affect the subsequent adhesion of the pressure sensitive adhesive-coated tape. By "release force" is meant the amount of peel force required to separate the adhesive-coated tape from the release-coated paper. The release force should not, however, be so low that the paper will be removed by forces normally encountered in processing the tape. To be effective, the silicone release coating must adhere preferentially to the release paper, since any tendency for the silicone release coating to transfer onto the adhesive-coated tape would have an adverse effect upon the subsequent adhesion of the pressure sensitive coated tape to other surfaces.

A conventional method of producing silicone-coated release papers involves first forming a curable release composition consisting of (1) a hydroxy end-blocked dimethylsiloxane gum stock; (2) a crosslinking agent such as a siloxane fluid containing silicon-bonded hydrogen units (Si-H); (3) a catalyst such as a metal salt of a carboxylic acid and (4) an organic solvent such as xylene. The composition is then applied to the paper substrate in the form of a coating and the coated substrate is heated mildly to drive off the solvent. After the solvent has been removed the siloxane composition on the substrate is cured at very high temperatures, e.g. 100° C. to 150° C., to crosslink the siloxane gum and form the desired release paper product.

The process described above for making silicone-coated release papers has several disadvantages. Increasing restrictions on the amount and type of volatile solvents which may be released into the atmosphere in work places makes it undesirable to employ compositions, such as those above, which contain solvents that must be removed by evaporation. Costly solvent recovery equipment must be used to prevent solvent fumes from escaping into the atmosphere. Moreover, the process described above consumes large amounts of energy in the solvent evaporation and curing steps. Yet another disadvantage of the process described above is the large size of the curing ovens which are necessary to achieve commercially acceptable production rates. Typically, the compositions described above require about 30 seconds to cure at 120° C. Thus, in order to achieve a continuous line speed of 500 ft. per minute, a curing oven of 250 ft. in length is required.

In some instances, systems similar to those described above are provided in the form of aqueous emulsions, rather than as solutions in organic solvents. However, the maintenance of stable emulsions is somewhat bothersome, requiring special mixing procedures and/or materials such as emulsifying agents. Emulsion stability is a particular concern when one desires to store the material for any significant period of time prior to use. Moreover, at some time during the application of the coating, heat must be applied to drive off the water of emulsion.

In order to overcome the problems associated with the solvent-based and aqueous emulsion, compositions described above, several attempts have been made to produce radiation curable release coatings which have no inert solvents that must be driven off into the atmosphere.

U.S. Pat. No. 3,726,710 describes radiation curable release compositions comprising an organopolysiloxane having olefinically unsaturated organic groups and a photosensitizer. The composition is applied to a paper substrate and cured by exposure to high intensity predominantly continuum radiation to produce a release coating. Unfortunately, this process necessitates the use of relatively costly radiation producing equipment which delivers energy at a very high flux. It would be more desirable to produce release coating compositions which could be cured using simpler forms of radiation producing equipment, such as conventional mercury arc lamps, at lower levels of delivered energy flux.

Great Britain Pat. No. 1,433,461 discloses a process for producing a release coating which comprises curing, by exposure to ultraviolet light, a composition comprising (a) a siloxane containing vinyl groups, (b) a siloxane crosslinker containing at least one silicon-bonded hydrogen atom per molecule, and (c) a photosensitizer. While the compositions of this patent cured to form release coatings, the cure rate of such compositions is rather slow for commercial purposes as is indicated by the line speeds achieved (see Table I and Table II of the patent).

U.S. Pat. No. 4,016,333 discloses a method of producing a release coating by radiation curing an emulsion containing a liquid alkyl hydrogen polysiloxane, an organic polyethylenic liquid, and a photosensitizer.

SUMMARY OF THE INVENTION

There is provided in accordance with the teachings of this invention a method of producing a silicone release coating on a substrate wherein there is applied to the substrate a coating of a composition comprising (a) an organopolysiloxane containing an average of at least 1, and preferably from 2 to 10 acryloxy and/or methacryloxy groups per molecule; (b) a low molecular weight polyacrylyl crosslinking agent chosen from the group consisting of low molecular weight organic polyacrylates and low molecular weight siloxane polyacrylates; and, optionally, (c) a photosensitizer. The applied composition can be rapidly cured on the substrate by exposure to ultraviolet radiation from conventional sources such as mercury arc lamps.

The cured silicone release coating on the substrate displays excellent release characteristics: that is, when employed as a protective covering over a pressure sensitive adhesive tape, the silicone release coated substrate was easily removed from the adhesive with little or no transfer of the release coating onto the adhesive and without significantly impairing the subsequent adhesion of the adhesive tape to other surfaces.

BRIEF DESCRIPTION OF THE DRAWING

The single FIGURE is a cross-sectional view of a laminate which comprises a pressure sensitive adhesive coated substrate having laminated thereto as a protective covering a substrate having the cured release coating composition of this invention on its surface.

DETAILED DESCRIPTION OF THE INVENTION

The organopolysiloxane compounds containing acryloxy and/or methacryloxy groups which are employed in the radiation curable compositions of this invention have the average formula $$\left[ R_n SiO_{\frac{4-n}{2}} \right]_m \quad (I)$$

wherein m has an average value greater than about 25, and is preferably from about 100 to 500; each R, individually, is acryloxy, methacryloxy, an unsubstituted monovalent hydrocarbon radical having from 1 to 20 carbon atoms or a substituted monovalent hydrocarbon radical wherein the substituents are selected from the class consisting of chloro, fluoro, cyano, amido, nitro, ureido, isocyanato, carbalkoxy, hydroxy, acryloxy, methacryloxy, and the like; and n has an average value of from about 1.8 to 2.2; said organopolysiloxane containing an average of at least one R group which contains an acryloxy or methacryloxy group, i.e.

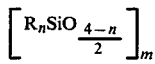

$$\begin{array}{c} O \\ \parallel \\ CH_2=CCO-, \\ | \\ X \end{array}$$

wherein X is hydrogen or methyl. Each acryloxy or methacryloxy group is attached to the siloxane backbone through a carbon-to-silicon bond or a carbon-oxygen-silicon bond. Preferably, there are present an average of from about 2 to 25, most preferably from about 2 to 10 such R groups containing an acryloxy or methacryloxy radical. Typically, the R groups have the structure

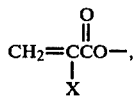

$$\begin{array}{c} O \\ \parallel \\ -R'OCC=CH_2 \\ | \\ X \end{array}$$

wherein R' is a divalent hydrocarbon radical of 1 to 15 carbon atoms, oxyalkylene having from 1 to about 4 carbons in the alkylene moiety, or nothing (i.e., a valence bond). The organopolysiloxanes described above can be linear or branched and are preferably essentially linear.

A particularly preferred organopolysiloxane contains from about 2 to about 10 units of the formula

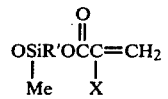

$$\begin{array}{c} O \\ \parallel \\ OSiR'OCC=CH_2 \\ | \quad\quad | \\ Me \quad X \end{array}$$

wherein Me is methyl, X is hydrogen or methyl and R' is an alkylene radical of from 1 to about 3 carbon atoms; and from about 100 to 500 dimethylsiloxy units, i.e. Me$_2$SiO.

As will be recognized by one skilled in the art, the organopolysiloxanes of formula I will also have an appropriate number of end-capping units, R$_3$SiO$_{\frac{1}{2}}$, at the terminals of the molecule (R is as previously defined). Preferably, the end-capping units are Me$_3$SiO$_{\frac{1}{2}}$, wherein Me is methyl.

The organopolysiloxanes containing acryloxy and/or methacryloxy groups described above are generally fluids which have viscosities in the range from about 25 cps. to 10,000 cps., preferably from 100 cps. to 5,000 cps. The organopolysiloxanes containing acryloxy and/or methacryloxy groups are known in the art, as are methods of producing them. Suitable methods for producing organopolysiloxanes containing acryloxy and/or methacryloxy groups are disclosed in U.S. Pat. No. 3,878,263, the disclosures of which are incorporated herein by reference.

The organopolysiloxane containing acryloxy and/or methacryloxy groups is employed in the radiation curable composition at a concentration of from about 10 to 90 weight percent, preferably from about 20 to 50 weight percent, based on the total weight of the radiation curable composition.

The second component of the radiation curable composition is the low molecular weight polyacrylyl crosslinking agent. This component is selected from the group consisting of low molecular weight organic polyacrylates and low molecular weight siloxane polyacrylates.

Suitable low molecular weight organic polyacrylates are any of the di-, tri- or tetracrylate or methacrylate esters of organic polyfunctional alcohols, which esters can have molecular weights up to about 1,200. As exemplary of suitable low molecular weight organic polyacrylates one can mention neopentyl glycol di-, tri-, or tetracrylate, ethylene glycol diacrylate, diethylene glycol diacrylate, 2',2'-dimethyl-3'-acryloxypropyl 2,2-dimethyl-3-acryloxypropionate, trimelylolpropane triacrylate, 1,6-hexanediol diacrylate, triethylene glycol diacrylate, and the like, or the corresponding methacrylates.

The low molecular weight siloxane polyacrylates which can be employed as the low molecular weight polyacrylyl crosslinking agent in the compositions of this invention are any compounds containing from 1 to about 25 siloxy groups, i.e.

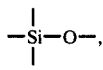

and from 2 to about 6 organic groups containing an acryloxy or methacryloxy radical. Preferably, the low molecular weight siloxane polyacrylate contains from about 1 to 10 siloxy groups and 2 to 4 organic groups containing an acryloxy or methacryloxy radical. For convenience, compounds defined in this paragraph containing a single siloxy group are referred to as "siloxane polyacrylates", even though they might more properly be referred to as "acryloxy silane esters" or "silicates". Each of the organic groups which contains an acryloxy or methacryloxy radical is bonded to a silicon atom by a carbon-silicon bond or a carbon-oxygen-silicon bond. Typically, the organic radicals containing acryloxy or methacryloxy groups are acryloxyalkyl or methacryloxyalkyl wherein the alkyl moiety contains from 1 to about 8 carbon atoms.

Preferred low molecular weight siloxane polyacrylates have the formula $MD_xM$ wherein D is a unit of the formula $R''_2SiO$ wherein $R''$, in each occurrence, is alkyl, alkoxy, acryloxyalkyl, methacryloxyalkyl, acryloxyalkoxy, or methacryloxyalkoxy; M, in each occurrence, is an end-capping unit chosen from the group consisting of alkyl of 1 to 8 carbon atoms and preferably methyl, acryloxyalkyl and methacryloxyalkyl having from 1 to 3 carbon atoms in the alkyl moiety, and $R''_3SiO_{\frac{1}{2}}$ wherein $R''$ is as previously defined; and x has a value of from 1 to about 25; provided that there are present in the compound from 2 to about 6, and preferably from 2 to 4, acryloxy and/or methacryloxy groups. As merely illustrative of suitable low molecular weight siloxane polyacrylates which can be employed as the low molecular weight polyacrylyl crosslinker in the radiation curable compositions of this invention, one can mention:

acrylate groups and siloxy groups in the siloxane polyacrylate.

The siloxane polyacrylates which contain a single siloxy group, such as that shown in formula II above, can be produced by reacting an alkoxyacrylosilane, e.g. gamma-acryloxypropyltrimethoxysilane, with hydroxyalkylacrylate, such as hydroxyethyl acrylate.

Siloxane polyacrylates exemplified by formulas III and IV can be produced by reacting hydroxyalkylacrylate with a corresponding chlorosiloxane, producing the desired siloxane polyacrylate and HCl as a byproduct. The reaction is run under partial vacuum to remove the HCl byproduct as it is formed. For example the siloxane polyacrylate of formula III can be produced by reacting 2 moles of hydroxyethyl acrylate with 1 mole of $$Cl-\underset{\underset{Me}{|}}{\overset{\overset{C_3H_6OCCH=CH_2}{|}}{\underset{|}{Si}}}-\left[\underset{\underset{Me}{|}}{\overset{\overset{Me}{|}}{OSi}}\right]_3-Cl$$

Suitable methods of producing the chlorosiloxane precursors are disclosed in U.S. Pat. No. 3,162,662 and U.S. Pat. No. 3,642,851.

The low molecular weight polyacrylyl crosslinking agent is employed in the radiation curable compositions of this invention at a concentration of from about 10 to about 90 weight percent, preferably from 50 to 80 weight percent, based on the total weight of the radiation curable composition.

While it is noted that both the organopolysiloxane containing acryloxy and/or methacryloxy groups and the low molecular weight polyacrylyl crosslinking agent components can be characterized by either acryloxy or methacryloxy groups therein, acryloxy groups are generally preferred because of their more rapid curing response to radiation.

When the radiation curable compositions are to be $$CH_2=CHCOC_2H_4O\underset{\underset{OMe}{|}}{\overset{\overset{OMe}{|}}{Si}}C_3H_6OCCH=CH_2, \qquad (II)$$

$$CH_2=CHCOC_2H_4O\underset{\underset{Me}{|}}{\overset{\overset{C_3H_6OCCH=CH_2}{|}}{Si}}-\left[\underset{\underset{Me}{|}}{\overset{\overset{Me}{|}}{OSi}}\right]_3-OC_2H_4OCCH=CH_2, \qquad (III)$$

$$CH_2=CHCOC_2H_4-O\left[\underset{\underset{Me}{|}}{\overset{\overset{Me}{|}}{SiO}}\right]_3\underset{\underset{OC_2H_4OCCH=CH_2}{|}}{\overset{\overset{C_3H_6OCCH=CH_2}{|}}{SiO}}\left[\underset{\underset{Me}{|}}{\overset{\overset{Me}{|}}{SiO}}\right]_3 C_2H_4OCCH=CH_2 \qquad (IV)$$

The low molecular weight siloxane polyacrylates of this invention can be produced by a number of methods. For example, certain of the siloxane polyacrylates can be produced by reacting acrylate-functional siloxanes with cyclic organopolysiloxanes and equilibrating in the presence of a base catalyst and an aprotic solvent as described in U.S. Pat. No. 3,878,263, Col. 2, line 3 et seq; provided that the starting materials and stoichiometry are selected so as to provide the desired number of cured by exposure to non-ionizing radiation, such as ultraviolet, there is also present in the compositions a photosensitizer. The photosensitizers are used in the usual known effective concentrations, typically up to about 10 weight percent, based on the total weight of the radiation curable composition. Preferably, the photosensitizer is employed at a concentration of from about 0.5 to 5 weight percent, based on the total weight of the radiation curable composition.

Photosensitizers are well known to those skilled in the art of photochemistry and no further elaboration is necessary for them to identify useful photosensitizers. Nonetheless, one can mention, as merely illustrative thereof, 2,2-diethoxyacetophenone, 2- or 3- or 4-bromoacetophenone, benzoin, the allyl benzoin ethers, benzophenone, benzoquinone, 1-chloroanthraquinone, p-diacetyl-benzene, 9,10-dibromoanthracene, 9,10-dichloroanthracene, 4,4-dichlorobenzophenone, 1,3-diphenyl-2-propanone, 1,4-napthyl-phenyl ketone, 2,3-pentanedione, propiophenone, chlorothioxanthone, xanthone and the like, or a mixture of these.

Those skilled in the art of photochemistry are fully aware that so-called "photoactivators" or "photosynergists" can be used in combination with the aforementioned photosensitizers and that synergistic effects are sometimes achieved when such combinations are used. Photoactivators are well known to those skilled in the art and require no further description herein for them to know what they are. Nonetheless, one can mention as illustrative of suitable photoactivators, methylamine, tributylamine, N-methyldiethanolamine, 2-aminoethylethanolamine, allylamine, cyclohexylamine, diphenylamine, ditolylamine, trixylylamine, tribenzylamine, n-cyclohexylethylenimine, piperadine, N-methylpiperazine, 2,2-dimethyl-1,3-bis-(3-N-morpholinyl)propionyloxy propane, and the like, or any mixture of these. The photoactivators, when used, are employed in the usual effective amounts which are known to those skilled in the art (see, e.g. U.S. Pat. No. 3,795,807).

Although not necessary to the practice of this invention, there may also be present in the radiation curable composition, in addition to the components previously mentioned, a conventional chemical crosslinking catalyst such as an organic peroxide, in the usual known effective concentrations.

In addition to the aforementioned components, there can also be present in the radiation curable composition conventional additives known in the coatings art such as diluents, flow control agents, levelling agents, pigments, and the like. Of course, it should be borne in mind that any component which does not coreact with the other components upon exposure to radiation will detract from the goal of producing a 100% radiation curable composition.

While the radiation curable compositions of this invention are generally applicable by conventional coating techniques without the necessity of heating them to improve fluidity, one may conceivably desire to add a diluent thereto, in which case it is preferred not to use an inert organic solvent which must be evaporated from the applied coating. In such a case, one can employ, as a radiation reactive diluent, a liquid organic monoacrylate ester (or, less desirably, a methacrylate ester), usually one having a viscosity of less than about 50 cps. Many such compounds are known, however, one can mention as merely illustrative thereof ethyl acrylate, butyl acrylate, 2-ethylhexyl acrylate, allyl acrylate, n-amyl acrylate, benzyl acrylate, cyclohexyl acrylate, 2-(N-methylcarbamoyloxy)ethyl acrylate, diethylaminoethyl acrylate, 2-ethoxyethyl acrylate, n-lauryl acrylate, n-octyl acrylate, octadecyl acrylate, and the like, or the corresponding methacrylates. If desired, a low-viscosity siloxane fluid having a single acrylate or methacrylate group bonded thereto may be employed as a radiation-reactive diluent. The radiation reactive diluent can be employed at a concentration of from 0.01 to about 30 weight percent, based on the total weight of the radiation curable coating composition.

If desired, there can also be present in the radiation curable composition a conventional silane adhesion promoter (i.e. coupling agent). We have found that the presence of such silane adhesion promoters in some instances decreased the tendency of the cured silicone release coating to transfer onto the adhesive surface. Silane adhesion promoters are well known in the art and generally include silane compounds having at least one reactive organic group bonded thereto. Preferably, the silane adhesion promoter is one which contains, as a reactive organic group, a vinyl group, i.e. $CH_2=C<$. Illustrative of such vinyl adhesion promoters are, vinyltriethoxysilane, vinyl-tris-(2-methoxyethoxy) silane, and gamma-methacryloxypropyltrimethoxysilane. The silane adhesion promoters can be employed at a concentration of from about 0.01 to about 15 weight percent, based on the total weight of the radiation curable composition.

The radiation curable composition which is cured to produce the silicone release coating of this invention is produced by mixing the aforementioned components. Generally, the components can be mixed at room temperature, however, mild heating may be employed in some instances to facilitate mixing. While the composition components may undergo a degree of separation during storage, mild agitation or mixing just prior to use is all that is necessary to redisperse the components.

The radiation curable compositions of this invention can be stabilized against premature polymerization during storage by the addition of a conventional polymerization inhibitor such as hydroquinone, monomethyl ether of hydroquinone, phenothiazine, di-tert-butyl paracresol, etc., in concentrations on the order of 0.1 weight percent or less.

The radiation curable composition is applied to a substrate as a coating by any conventional means known in the coating art such as reverse roll coating, curtain coating, doctor knife, brushing, spraying, or dipping the substrate in the coating. While paper will undoubtedly be one of the most commonly employed substrates, the compositions of this invention can be suitably applied to any substrate whose release properties it is desired to improve. For example, the compositions can be employed to form release coatings on substrates as diverse as glass, steel, aluminum, polyester, and non-woven fabrics.

While it is preferred to premix the components of the radiation curable composition prior to application on the substrate, it is also possible to form the composition on the substrate by individual application of the components thereto, such as by simultaneously spraying the individual components onto the substrate surface.

The amount of radiation curable composition applied to the substrate varies, depending on the properties desired in the release coating, the radiation source used, the particular formulation used, etc. Theoretically, there is no lower limit to the applied coating weight, provided the substrate surface is covered, however, practical limitations will be imposed by the particular coating method used. For economic reasons it is normally desired to use the lowest possible applied coating weight. For purposes of producing a silicone release coated paper useful as a protective covering for a pressure sensitive adhesive tape, we have found that applied coating weights from about 0.6 to 2.6 g. per square meter of coated substrate are quite satisfactory.

The radiation curable composition which has been applied to the substrate can be cured by exposure to the known forms of ionizing or actinic non-ionizing radiation. Suitable forms of radiation include ultraviolet light, electron beam, x-ray, gamma-ray, beta-ray, etc. The equipment for generating these forms of energy is known in the art. We prefer to employ ultraviolet light, due to the simplicity and ready availability of equipment for generating it and the relatively low amounts of energy consumed by such equipment.

Curing may be carried out in an air atmosphere or in an inert atmosphere such as argon or nitrogen. Exposure time required to cure the applied composition varies with such factors as the particular formulation used, type and wavelength of radiation, energy flux, concentration of photosensitizer and thickness of the coating, but it is generally quite short, that is, less than about 10 seconds. We have found that exposing the compositions to excessive amounts of radiation may "overcure" the compositions, resulting in poor release properties. The amount of radiation which is excessive varies with the given formulation, coating thickness, radiation source, etc., and may easily be determined by the skilled worker without undue experimentation. Typically, when employing ultraviolet light at a delivered flux of 65 watts/ft.$^2$, we have found that exposures substantially in excess of about 2 seconds caused poor release properties in a number of the compositions.

We have found that silicone coated release papers having the cured compositions of this invention on their surfaces displayed an excellent balance of release properties. In particular, when the silicone coated release paper is used as a protective covering on a pressure sensitive adhesive tape, a relatively low release force was required to separate the release coated paper and the adhesive tape, yet there was little transfer of the silicone release coating from the paper onto the adhesive and there was relatively little adverse effect on the subsequent adhesion of the adhesive tape to other adherends.

As previously indicated, the substrate having the cured silicone release composition of this invention on its surface can be employed as a protective covering for a second substrate having on its surface a coating of a pressure sensitive adhesive. The protective covering is normally applied to the adhesive-coated substrate by bringing the two coated substrates into surface-to-surface contact, with the silicone release coating on the first substrate in contact with the pressure sensitive adhesive on the second substrate. Slight pressure is normally applied to cause the coated substrates to adhere. There is thus formed a separable four-layered laminate.

With reference to the single FIGURE, the laminate comprises: a first substrate, 1; a second substrate, 2; a release layer, 3, consisting of the silicone release coating of this invention which has been cured by exposure to radiation; and a layer consisting of a pressure sensitive adhesive composition, 4; said release layer being interposed between said first substrate and said pressure sensitive adhesive layer and being preferentially adherent to the first substrate, and said pressure sensitive adhesive layer being interposed between said release coating and said second substrate and being preferentially adherent to said second substrate.

Any pressure sensitive adhesive composition known in the art can be employed as the pressure sensitive adhesive layer. (see, e.g. "Adhesion and Bonding", *Encyclopedia of Polymer Science and Technology*, Vol. 1, p. 486, Interscience Publishers, 1964.) Typically, such compositions contain, as the major constituent, an adhesive polymer such as natural, reclaimed, or styrenebutadiene rubber, polyisobutylene, poly(vinyl ether), or poly(acrylic esters). Other typical constituents of pressure sensitive adhesive compositions may be present, including, for example, resin tackifiers such as rosin esters, oil-soluble phenolics, or polyterpenes; antioxidants; plasticizers such as mineral oil, liquid polyisobutylenes, or lanolin; and fillers such as zinc oxide or hydrated alumina. The nature of the particular pressure sensitive adhesive used does not constitute the invention herein and those skilled in the art will be familiar with many such suitable compositions.

Usually, one or both substrates is a flexible material, in order that they can be easily separated by peeling. Suitable flexible substrates for use as either the first or second substrate include, for example, paper, polymeric materials such as cellophane, polyethylene terephthate, polyvinyl chloride, polyethylene, and the like, metallic foils, etc. Suitable rigid substrates include, by way of example, metal surfaces such as steel, aluminum, and the like, rigid or semi-rigid polymeric materials such as vinyl floor tiles, glass, wood, etc.

The following examples are intended to further illustrate the invention and are not intended to limit it in any way. Unless otherwise stated, all parts and percents are by weight. In most cases, test values given are average for repetitive tests.

As used herein the following abbreviations have the indicated meanings

| Abbreviation | Meaning |
|---|---|
| HDODA | Hexanediol diacrylate |
| NPGDA | Neopentyl glycol diacrylate |
| TMPTA | Trimethylol propane triacrylate |
| PETA | Pentaerythritol triacrylate |
| ED204DA | 2',2'-dimethyl-3'-acryloxypropyl 2,2-dimethyl-3-acryloxypropionate |
| MCEA | 2-(N-methylcarbamoyloxy)ethyl acrylate |
| DBAP | Dibutoxyacetophenone |
| ED204EODA | Diacrylate ester produced by reacting two moles of acrylic acid with an adduct of 1 mole 2',2'-dimethylpropyl-3'-hydroxy 2,2-dimethyl-3-hydroxypropionate and 4 moles ethylene oxide. |
| ED204PODA | Diacrylate ester produced by reacting two moles of acrylic acid with an adduct of 1 mole 2',2'-dimethylpropyl-3'-hydroxy 2,2-dimethyl-3-hydroxypropionate and 4 moles 1,2-propylene oxide |

The organopolysiloxanes containing acryloxy groups which were used in the examples are given the following designations:

| Designation | Structure* |
|---|---|
| A (90,10) | $MD_{90}D_{10}'M$ |
| A (294,6) | $MD_{294}D_6'M$ |
| *M = Me$_3$SiO$_{\frac{1}{2}}$ | |
| D = Me$_2$SiO | |

| Designation | Structure* |
|---|---|
| -continued | |

$$D' = CH_2=CHCOC_3H_6SiO$$
            |
            Me where Me is methyl

The siloxane polyacrylate crosslinkers used in the examples are given the following designations:

Siloxane diacrylate

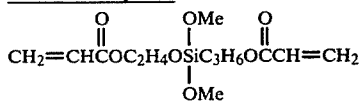

Siloxane triacrylate

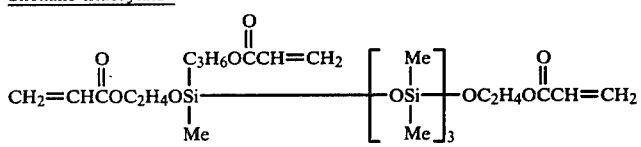

Tetrafunctional Siloxane Acrylate

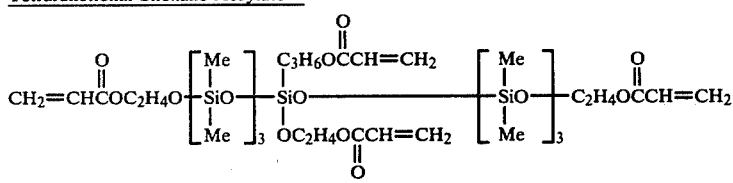

The ultraviolet radiation sources used to cure the radiation curable compositions on the substrates are described below.

| Designation | Lamps | Curing Atmosphere | Delivered UV Flux |
|---|---|---|---|
| Source I | 27 low pressure germicidal lamps (<1 watt/in.) Unfocused | Nitrogen | 65 watts/ft.$^2$ |
| Source II | 1 high pressure lamp (200 watts/in.) Focused | Air | 200 watts/in. length |

EXAMPLE 1

A series of 12 radiation curable silicone release coating compositions within the scope of this invention were produced by admixing organopolysiloxane A (294,6), tetrafunctional siloxane crosslinker, and dibutoxyacetophenone as a photosensitizer, in the amounts listed in the table below. As controls, two compositions, identified C-1 and C-2, were prepared which contained, respectively, A (294,6) and photosensitizer (no crosslinker); and tetrafunctional crosslinker and photosensitizer (no organopolysiloxane).

Each of the compositions was applied to glassine paper at an approximate coating weight of 0.45 lb./ream (the term "ream" herein means 3,000 sq. ft.). The coatings on the paper were cured by exposure to radiation from Source I. Exposure time given in the table is the shortest exposure at which complete cure could be effected.

The glassine papers coated with the cured silicone release composition were then laminated under pressure (4.5 lb. roller) with a commercial pressure sensitive adhesive coated tape (Scotch$^R$ 610 high tack adhesive). After aging the laminates for 20 hours at 70° C. under an applied pressure of about ¼ p.s.i., the release force, measured in grams per inch width, required to separate the composites at the silicone-adhesive interface was determined by TAPPI routine control method RC-283. The peel strengths of the pressure sensitive adhesive coated tapes bonded to steel were measured, by TAPPI routine control method RC-283, both before and after they had been laminated to the silicone release coated papers. Subsequent adhesion, reported in the table below, represents the peel strengths of the pressure sensitive adhesive coated tapes after lamination with the release papers as a percentage of their peel strengths prior to lamination.

It can be seen that compositions 2–10 all yielded release coatings which exhibited aged release forces less than 25 g./in. and yet allowed the adhesive to retain greater than 90% of its original adhesion. By comparison, C-1 did not cure and C-2, while it did cure, exhibited poor release properties. Although compositions 11 and 12 did not cure under the condition of this experiment, it will be seen in Example 7 that curable release compositions containing about 90% organopolysiloxane can be produced.

| | 1 | 2 | 3 | 4 | 5 | 6 | 7 | 8 | 9 | 10 | 11 | 12 | C-1 | C-2 |
|---|---|---|---|---|---|---|---|---|---|---|---|---|---|---|
| Compositions, parts by weight | | | | | | | | | | | | | | |
| A (294,6) | 10 | 10 | 10 | 30 | 30 | 30 | 50 | 50 | 50 | 70 | 80 | 90 | 100 | 0 |
| Tetrafunctional Siloxane crosslinker | 90 | 90 | 90 | 70 | 70 | 70 | 50 | 50 | 50 | 30 | 20 | 10 | 0 | 100 |
| DBAP | 1 | 3 | 5 | 1 | 3 | 5 | 1 | 3 | 5 | 3 | 3 | 3 | 5 | 5 |
| Radiation exposure | | | | | | | | | | | | | | |
| Exposure time, sec. | 0.3 | <0.26 | <0.26 | 0.3 | <0.26 | <0.26 | 1.8 | 0.9 | 0.9 | 0.9 | --No cure-- | | | 1.8 |
| Line speed, ft./min. | 600 | >700 | >700 | 600 | >700 | >700 | 100 | 200 | 200 | 200 | | | | 100 |

-continued

|  | 1 | 2 | 3 | 4 | 5 | 6 | 7 | 8 | 9 | 10 | 11 | 12 | C-1 | C-2 |
|---|---|---|---|---|---|---|---|---|---|---|---|---|---|---|
| Properties |  |  |  |  |  |  |  |  |  |  |  |  |  |  |
| Aged release, g./in. | 50 | 15 | 15 | 5 | 5 | 10 | 0 | 5 | 10 | 25 |  |  |  | 545 |
| Subsequent adhesion, % | 76 | 92 | 94 | 91 | 93 | 95 | 100 | 100 | 100 | 97 |  |  |  | 79 |

EXAMPLE 2

Using procedures similar to those of Example 1, silicone release coated glassine papers were produced by applying a series of three radiation curable compositions to glassine paper and curing the compositions by exposure to ultraviolet light from Source I. In this example, however, a variety of organic diacrylates were employed as the crosslinkers in the compositions. The silicone release coated papers were evaluated in a manner similar to those of Example 1, and the results appear below.

| Comosition, parts by weight |  |  |  |
|---|---|---|---|
| A (294,6) | 50 | 50 | 50 |
| ED 204 PODA | 48 | — | — |
| ED 204 EODA | — | 48 | — |
| ED 204 DA | — | — | 48 |
| DBAP | 2 | 2 | 2 |
| Radiation Exposure |  |  |  |
| Exposure time, sec. | 0.9 | 0.9 | 0.9 |
| Line speed, ft./min. | 200 | 200 | 200 |
| Properties |  |  |  |
| Aged release, g./in. | 0-5 | 0-5 | 0-5 |
| Subsequent adhesion, % | 95-100 | 95-100 | 95-100 |

EXAMPLE 3

Using procedures similar to those of Example 1, silicone release coated glassine papers were produced by applying to the papers a series of radiation curable compositions produced by admixing organopolysiloxane A (90,10) with various organic polyacrylate crosslinkers and dibutyoxyacetophenone as a photosensitizer, then curing the composition on the paper by irradiation with Source I. The silicone release coated papers were evaluated for release properties in the same manner as those of Example 1, and the results appear below. Additionally, results are reported for initial release force prior to aging the laminate.

Although the aged release properties of these cured compositions were not as good as those of Examples 1 and 2, the initial release properties were quite good.

EXAMPLE 4

A series of three radiation curable compositions were prepared by mixing organopolysiloxane A (90,10) with various siloxane polyacrylate crosslinkers and dibutyoxyacetophenone as a photosensitizer. The compositions were drawn down onto glassine paper using a knife blade at an approximate coating weight of 0.6 lb./ream. The compositions on the paper were cured by exposure, in sequence, to Source II, Source I, and again to Source II. Cure line speed is given in the table below. The inital release properties and release properties after aging 20 hours at 70° C. under ¼ p.s.i. pressure were measured and are reported in the table.

| Composition, parts by weight |  |  |  |
|---|---|---|---|
| A (90,10) | 50 | 50 | 50 |
| Siloxane triacrylate | 48 | — | — |
| Siloxane diacrylate | — | 48 | — |
| Tetrafunctional siloxane acrylate | — | — | 48 |
| DBAP | 2 | 2 | 2 |
| Cure line speed, ft./min. | 700 | 800 | 600 |
| Properties |  |  |  |
| Initial release, g./in. | 10 | 50 | 25 |
| Subsequent adhesion, % | 88 | 84 | 93 |
| Aged release, g./in. | 145 | 235 | 175 |
| Subsequent adhesion, % | 87 | 79 | 89 |

EXAMPLE 5

In this example a series of silicone release coatings were formed on glassine paper by irradiating compositions within the scope of this invention that contained varying amounts of an organic monoacrylate therein, specifically 2-(N-methylcarbamoyloxy)ethyl acrylate. The compositions were applied using a smoothing bar at an approximate coating weight of 1.5 lb./ream and cured by exposure to radiation from Source I.

We have found that the use of this monofunctional acrylate in limited quantity tends to improve somewhat the subsequent adhesion values, particularly after aging, and to reduce the tendency of the silicone release coating to transfer onto the adhesive surface. The use of the

| Composition, parts by weight |  |  |  |  |  |
|---|---|---|---|---|---|
| A(90,10) | 65 | 65 | 65 | 65 | 65 |
| DBAP | 1 | 1 | 1 | 1 | 1 |
| NPGDA | 34 | — | — | — | — |
| TMPTA | — | 34 | — | — | — |
| HDODA | — | — | 34 | — | — |
| PETA | — | — | — | 34 | — |
| ED204DA | — | — | — | — | 34 |
| Radiation exposure |  |  |  |  |  |
| Exposure time, sec. | 0.24 | 0.49 | 0.45 | >18 | <0.21 |
| Line speed, ft./min. | 750 | 370 | 400 | <10 | >875 |
| Properties |  |  |  |  |  |
| Initial release, g./in. | 5 | 0 | 5 | Incomplete cure | 0 |
| Subsequent adhesion, % | 82 | 96 | 95 |  | 87 |
| Aged release, g./in. | 420 | 370 | 410 |  | 340 |
| Subsequent adhesion, % | 62 | 70 | 61 |  | 45 | monoacrylate had no adverse effect on the release properties of the silicone coated release paper. Results are reported in the table below.

| Composition, parts by weight | | | | | | | | |
|---|---|---|---|---|---|---|---|---|
| A (90,10) | 60 | 60 | 60 | 60 | 60 | 60 | 60 | 60 |
| HDODA | 10 | 15 | 20 | 25 | 30 | 34 | 37 | 39 |
| MCEA | 30 | 25 | 20 | 15 | 10 | 6 | 3 | 1 |
| DBAP | 2 | 2 | 2 | 2 | 2 | 2 | 2 | 2 |
| Radiation Exposure | | | | | | | | |
| Exposure time, sec. | 0.6 | 0.51 | 0.45 | 0.4 | 0.33 | 0.3 | 0.3 | 0.3 |
| Line speed, ft./min. | 300 | 350 | 400 | 450 | 550 | 600 | 600 | 600 |
| Properties | | | | | | | | |
| Initial release, g./in. | 10 | 0 | 0 | 5 | 5 | 0 | 0 | 0 |
| Subsequent adhesion, % | 100 | 90 | 100 | 97 | 93 | 100 | 100 | 100 |
| Aged release, g./in. | 30 | 35 | 30 | 25 | 15 | 50 | 50 | 55 |
| Subsequent adhesion, % | 100 | 100 | 100 | 100 | 99 | 70 | 68 | 72 |

EXAMPLE 6

In this example a series of silicone release coatings were formed on glassine paper by irradiating compositions within the scope of this invention that contained varying amounts of gamma-methacryloxypropyltrimethoxysilane therein as adhesion promoters. The compositions were applied to the paper using a smoothing bar at an approximate coating weight of 1.5 lb./ream and cured by exposure to radiation from Source I.

The cured release coated papers were laminated to adhesive-coated tape and tested for release force and the adhesive tapes were tested for subsequent adhesion. Measurements were taken initially and after aging the laminates for 20 hours at 70° C. under ¼ p.s.i. pressure. Additionally, each time the laminates were tested for release force, the amount of silicone release coating which transferred onto the adhesive surface upon separation was observed visually and estimated as a percentage of the total release coating originally applied to the paper. As a control, there was applied and tested in a similar manner a similar composition which contained no gamma-methacryloxypropyltrimethoxysilane. Results appear in the table below. It can be seen that the presence of the gamma-methacryloxypropyltrimethoxysilane at concentrations up to 15% by weight virtually eliminated the tendency of the cured silicone release coating to transfer onto the adhesive.

| Composition, parts by weight | | | | |
|---|---|---|---|---|
| A (90,10) | 60 | 60 | 52 | 44 |
| HDODA | 38 | 37 | 31 | 24 |
| Gamma-methacryloxy propyl-trimethoxysilane | 0 | 1 | 15 | 30 |
| DBAP | 2 | 2 | 2 | 2 |
| Radiation exposure | | | | |
| Cure time, sec. | 0.9 | 0.9 | 7.2 | No cure |
| Line speed, ft./min. | 200 | 200 | 25 | |
| Properties | | | | |
| Initial release, g./in. | 55 | 30 | 45 | |
| Subsequent adhesion, % | 95 | 100 | 99 | |
| Release coating transfer, % | 20 | 0 | 0 | |
| Aged release, g./in. | 25 | 15 | 120 | |
| Subsequent adhesion, % | 76 | 100 | 100 | |
| Release coating transfer, % | 50 | 10 | 0 | |

EXAMPLE 7

In this example, a series of three radiation curable silicone release compositions, each containing 90 parts by weight of an organopolysiloxane containing acryloxy groups, 10 parts by weight of hexanediol diacrylate as a crosslinker, and varying concentrations of dibutoxyacetophenone were applied to glassine paper using a smoothing bar, at an applied coating weight of about 1.5 lb./ream. The applied coatings on the substrates were cured by exposure to radiation from Source I. The papers having the cured release coatings on their surfaces were laminated to pressure sensitive adhesive tapes and tested for initial release force and aged release force in a manner similar to Example I. Results appear below.

| Composition, parts by weight | | | |
|---|---|---|---|
| A (90,10) | 90 | 90 | 90 |
| HDODA | 10 | 10 | 10 |
| DBAP | 0.5 | 1.6 | 5 |
| Raidation exposure | | | |
| Exposure time, sec. | 1.2 | 0.6 | 0.6 |
| Line speed, ft./min. | 150 | 300 | 300 |
| Properties | | | |
| Initial release, g./in. | 0 | 0 | 5 |
| Subsequent adhesion, % | 46 | 61 | 80 |
| Aged release, g./in. | 65 | 220 | 160 |
| Subsequent adhesion, % | 0 | 10 | 26 |

The results of this example show that one can produce compositions within the scope of this invention, having a 9 to 1 weight ratio of organopolysiloxane to crosslinker, which can be cured on a substrate to impart release properties. However, at this high, non-preferred concentration of organopolysiloxane, transfer of the release coating from the paper substrate onto the adhesive surface becomes somewhat of a problem, thus impairing the subsequent adhesion of the adhesive-coated tape.

EXAMPLE 8

The following two radiation curable silicone release compositions were prepared and applied to paper (supercalendered Kraft) at an approximate coating weight of 1.5 lb./ream.

| Composition, parts by weight | I | II |
|---|---|---|
| A (294,6) | 20 | 50 |
| ED204DA | 78 | 48 |
| DBAP | 2 | 2 |

The compositions on the paper were cured by varying amounts of exposure to Source I. In some instances, the ultraviolet flux was reduced from 65 watts/ft$^2$ to 35 watts/ft$^2$ for curing. The cured release coatings on the paper were laminated to adhesive-coated tapes and tested for aged release and subsequent adhesion in a manner similar to the compositions of Example 1. The results appear in the table below.

| Composition | I | I | I | II | II |
|---|---|---|---|---|---|
| Curing Conditions | | | | | |
| Exposure time, sec. | 0.26 | 0.26 | 0.21 | 0.26 | 0.26 |
| Line speed, ft./min. | 700 | 700 | 850 | 700 | 700 |
| Ultraviolet flux, watts/ft$^2$ | 65 | 35 | 35 | 65 | 35 |
| Properties | | | | | |
| Aged release, g./in. | 28 | 18 | 12 | 3 | 7 |
| Subsequent adhesion, % | 100 | 100 | 91 | 95 | 92 |

No transfer of cured silicone release coating onto the adhesive surface could be observed in any of the laminates.

What is claimed is:

1. A silicone release coating composition, curable by exposure to ionizing radiation or actinic nonionizing radiation, comprising:
   (A) from 10 to 90 weight percent, based on the total weight of the composition, of an organopolysiloxane of the formula

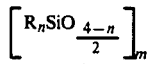

wherein m has an average value greater than about 25; each R, individually, is acryloxy, methacryloxy, an unsubstituted monovalent hydrocarbon radical having from 1 to 20 carbon atoms or a substituted monovalent hydrocarbon radical wherein the substituents are selected from the class consisting of chloro, fluoro, cyano, amido, nitro, ureido, isocyanato, carbalkoxy, hydroxy, acryloxy and methacryloxy; and n has an average value of from about 1.8 to 2.2; said organopolysiloxane containing an average of at least one acryloxy or methacryloxy group;
   (B) from 90 to 10 weight percent, based on the weight of the composition of a low molecular weight acrylyl crosslinker chosen from the group consisting of
      (i) di-, tri-, and tetrafunctional acrylate or methacrylate esters of organic polyfunctional alcohols, having a molecular weight up to about 1,200, and
      (ii) low molecular weight siloxane polyacrylates having from 1 to about 25 siloxy groups and from 2 to about 6 organic groups which contain an acryloxy or methacryloxy radical, each of said organic groups being bonded to a silicon atom through a carbon-silicon or carbon-oxygen-silicon bond; and
   (C) from 0 to about 10 weight percent, based on the weight of the composition, of a photosensitizer.

2. A silicone release coating composition as claimed in claim 1, wherein said component (A) is present at a concentration of from 20 to 50 weight percent and said component (B) is present at a concentration of from 50 to 80 weight percent.

3. A silicone release coating composition as claimed in claim 1, wherein said photosensitizer is present at a concentration of from 0.5 to 5 weight percent.

4. A silicone release coating composition as claimed in claim 2, wherein said photosensitizer is present at a concentration of from 0.5 to 5 weight percent.

5. A silicone release coating composition as claimed in claim 1, wherein said organopolysiloxane contains from 2 to 10 acryloxy and/or methacryloxy groups.

6. A silicone release coating composition as claimed in claim 1, wherein said organopolysiloxane, component (A), is an essentially linear compound containing from about 2 to about 10 groups of the formula

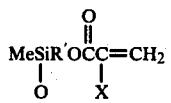

wherein X is hydrogen or methyl and R' is alkylene of from 1 to about 3 carbon atoms; from about 100 to about 500 groups of the formula Me$_2$SiO; and terminal groups of the structure Me$_3$SiO$_{\frac{1}{2}}$.

7. A silicone release coating composition as claimed in claim 1, wherein said low molecular weight polyacrylyl crosslinker, component (B), is a low molecular weight siloxane acrylate of the formula MD$_x$M wherein D, in each occurrence, is a unit of the formula R''$_2$SiO, wherein R'', in each occurrence, is alkyl, acryloxyalkyl, methacryloxyalkyl, acryloxyalkoxy, or methacryloxyalkoxy; M, in each occurrence, is an end capping unit chosen from the group consisting of alkyl of from 1 to 8 carbon atoms, acryloxyalkyl and methacryloxyalkyl, and R''$_3$SiO$_{\frac{1}{2}}$ wherein R'' is alkyl, acryloxyalkyl, methacryloxyalkyl, acryloxyalkoxy, and methacryloxyalkoxy; and x has a value of from 1 to about 25; provided there are present in the compound from 2 to about 6 acryloxy and/or methacryloxy groups.

8. A silicone release coating composition as claimed in claim 1, wherein said low molecular weight polyacrylyl crosslinker is 2',2'-dimethyl-3'-acryloxypropyl 2,2-dimethyl-3-acryloxypropionate.

9. A silicone release coating composition as claimed in claim 1, wherein said low molecular weight polyacrylyl crosslinker is

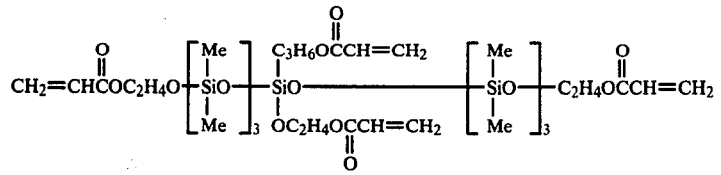

10. A silicone release coating composition as claimed in claim 1, wherein there is additionally present in the composition, from 0.01 to 30 weight percent, based on the weight of the composition, of a liquid organic monoacrylate ester compound having a viscosity of less than about 50 cps.

11. A silicone release coating composition as claimed in claim 10, wherein said liquid organic monoacrylate ester compound is 2-(N-methylcarbamyloxy)ethyl acrylate.

12. A silicone release coating composition as claimed in claim 1, wherein there is additionally present therein from 0.01 to about 15 weight percent, based on the weight of the composition, of a silane adhesion promoter.

13. A silicone release coating composition as claimed in claim 12, wherein said silane adhesion promoter is gamma-methacryloxypropyltrimethoxysilane.

14. A method of producing a silicone release coated article which comprises:
   (A) applying to a substrate a coating of the composition claimed in claim 1; and
   (B) curing the coating on the substrate by exposing it to ionizing or non-ionizing actinic radiation.

15. A method as claimed in claim 14, wherein the coating composition is a composition as claimed in claim 2.

16. A method as claimed in claim 14, wherein the coating composition is a composition as claimed in claim 3 and wherein the coating on the substrate is cured by exposure to ultraviolet light.

17. A method as claimed in claim 14, wherein the coating composition is a composition as claimed in claim 4 and wherein the coating on the substrate is cured by exposure to ultraviolet light.

18. A method as claimed in claim 14, wherein the coating composition is a composition as claimed in claim 5.

19. A method as claimed in claim 14, wherein the coating composition is a composition as claimed in claim 6.

20. A method as claimed in claim 14, wherein the coating composition is a composition as claimed in claim 7.

21. A method as claimed in claim 14, wherein the coating composition is a composition as claimed in claim 8.

22. A method as claimed in claim 14, wherein the coating composition is a composition as claimed in claim 9.

23. A method as claimed in claim 14, wherein the coating composition is a composition as claimed in claim 10.

24. A method as claimed in claim 14, wherein said coating composition is a composition as claimed in claim 11.

25. A method as claimed in claim 14, wherein said coating composition is a composition as claimed in claim 12.

26. A method as claimed in claim 14, wherein said coating composition is a composition as claimed in claim 13.

27. A method as claimed in claim 14, wherein said substrate is paper.

28. A release coated article comprising a substrate having on its surface a coating of a composition as claimed in claim 1, which has been cured by exposure to radiation.

29. A release coated article as claimed in claim 28, wherein said substrate is paper.

30. A laminate comprising:
   (a) a first substrate;
   (b) a second substrate;
   (c) a release layer consisting of a composition as claimed in claim 1 which has been cured by exposure to radiation; and
   (d) a layer consisting of a pressure sensitive adhesive composition;
said release layer being interposed between said first substrate and layer of pressure sensitive adhesive and being preferentially adherent to said first substrate; and said pressure sensitive adhesive layer being interposed between said release layer and second substrate and being preferentially adherent to said second substrate.

31. A laminate as claimed in claim 30, wherein said first substrate is paper.

* * * * *